(12) United States Patent
Li et al.

(10) Patent No.: US 10,710,400 B2
(45) Date of Patent: Jul. 14, 2020

(54) WHEEL HAVING IMAGE DISPLAY

(71) Applicant: CITIC Dicastal CO., LTD., Qinhuangdao, Hebei (CN)

(72) Inventors: Chuanqun Li, Qinhuangdao (CN); Weidong Liu, Qinhuangdao (CN); Congshan Jia, Qinhuangdao (CN); Shaoqian Wang, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 0 days.

(21) Appl. No.: 16/220,308

(22) Filed: Dec. 14, 2018

(65) Prior Publication Data

US 2019/0291507 A1    Sep. 26, 2019

(30) Foreign Application Priority Data

Mar. 21, 2018  (CN) .......................... 2018 1 0232961

(51) Int. Cl.
*B60B 7/00* (2006.01)
*B60Q 1/32* (2006.01)
*G09F 21/04* (2006.01)

(52) U.S. Cl.
CPC .............. *B60B 7/006* (2013.01); *B60Q 1/326* (2013.01); *G09F 21/045* (2013.01)

(58) Field of Classification Search
CPC ....... B60B 7/00; B60B 7/0026; B60B 7/0033; B60B 7/006; G09F 21/045; B60Q 1/2661; B60Q 1/326
See application file for complete search history.

(56) References Cited

U.S. PATENT DOCUMENTS

| | | | | |
|---|---|---|---|---|
| 6,936,980 | B2 * | 8/2005 | Wang | B60Q 1/326 301/37.108 |
| 7,063,391 | B2 * | 6/2006 | Peng | B60B 1/00 301/37.108 |
| 8,967,838 | B1 * | 3/2015 | Miller | F21K 9/233 362/239 |
| 9,845,045 | B2 * | 12/2017 | Fisher | B60B 7/00 |
| 2002/0145330 | A1 * | 10/2002 | Abbe | B60B 7/006 301/37.108 |
| 2005/0140201 | A1 * | 6/2005 | Wang | B60B 7/20 301/37.101 |
| 2009/0015057 | A1 * | 1/2009 | Groomes | B60B 7/20 301/37.108 |
| 2017/0136813 | A1 * | 5/2017 | Becker | B60B 7/006 |
| 2019/0152381 | A1 * | 5/2019 | Mitogo | B60Q 1/326 |

* cited by examiner

*Primary Examiner* — Jason R Bellinger
(74) *Attorney, Agent, or Firm* — Cooper Legal Group, LLC

(57) ABSTRACT

A wheel for displaying images is provided. The wheel includes a wheel body and a dazzling imaging portion, in which the wheel body includes a wheel disc surface, a center flange and a rim, the wheel disc surface includes spokes, one end of each spoke is connected to the center flange and the other end is connected to the rim, the center flange includes a center hole and bolt holes uniformly distributed around the center hole, and the rim is connected to the ends of the spokes and extends in a direction perpendicular to the wheel disc surface; the dazzling imaging portion is composed of a circuit board, connecting wires, an FPC, a battery, a decorative cap and decorative lights; and the decorative cap is composed of a circular cover plate and one or more mounting arms.

8 Claims, 3 Drawing Sheets

WHEEL HAVING IMAGE DISPLAY

CROSS-REFERENCE TO RELATED APPLICATIONS

The present application claims benefit of Chinese Patent Application No. 201810232961.3, filed on Mar. 21, 2018, the contents of which are hereby incorporated by reference in its entirety.

BACKGROUND

Automobiles have evolved into important products for people's daily lives. People are increasingly demanding automotive aesthetics while pursuing performance. As an important part of an automobile, the automobile wheel is not only related to the driving safety and comfort of the automobile, but also has an important influence on the aesthetics of the entire vehicle. As an important safety part and appearance part of the automobile, the aluminum alloy wheel plays an important role in good comprehensive performance of safety, aesthetics, recyclability and light weight (at least 30% of the weight reduced), especially wins the favor of the market in the attractive appearance, and has become the best choice for people.

However, as people's demands for the appearance and personalization of automobiles are increasing, it is hoped that the wheel disc surface of the wheel also has a better decorative and display function, thereby providing a better body appearance. At present, the wheel disc surface of the wheel is generally decorated by color or color register coating thereof. This method only can produce a static decorative effect on the wheel disc surface. Decorative lights are arranged on the wheel disc surfaces of some wheels at present to provide a dynamic wheel disc decoration effect. However, since the wheel is a non-stop rotating component, the decorative lights on the wheel are difficult in obtaining electric energy from the body. Generally, only a battery with small capacity can be used for supplying power, which limits the selection and use of the decorative lights.

SUMMARY

The present disclosure relates to the technical field of motor vehicle parts, specifically to a wheel for displaying dynamic images.

The object of the present disclosure is to provide a dynamic imaging wheel having an independent power supply system. Specifically, a wheel with an automatic power generation system is provided. The use of the wheel is expected to achieve different dynamic patterns on the front of the wheel during driving of the automobile by controlling the parameters such as color and strength of a series of light-emitting diodes (LED) mounted on front ribs of the wheel according to the rotational speed of the wheel.

In other aspects of the present disclosure, further disclosed is the following technical solution.

During normal driving of the automobile, the wheel drives the circuit board, the battery bushing and the magnetic coil to rotate; since the eccentric weight is a non-full cylinder and the center of gravity is lower, the eccentric weight, the strong magnet and the rotating shaft do not rotate under the co-action of the bearing system and the eccentric weight, the magnetic coil continuously cuts the magnetic lines to generate current, and power is supplied to the LED lights through the connecting wires.

In a preferred aspect of the present disclosure, the magnetic power generation portion further includes a battery, and the battery is configured to supply power to the LED lights when the rotational speed of the automobile is low; the magnetic power generation portion supplies power to the LED lights during normal driving, and stores redundant power to the battery.

In a preferred aspect of the present disclosure, the magnetic power generation portion is connected to the dazzling imaging portion, the control portion and the rotational speed detecting portion, and the control portion is connected with the dazzling imaging portion via a flexible circuit board.

In a preferred aspect of the present disclosure, the control portion is a hand-held cell phone, and the hand-held cell phone is in data connection with the rotational speed detecting portion and the dazzling imaging portion via Bluetooth or a wireless network.

In a preferred aspect of the present disclosure, the flexible circuit board (FPC) has super-flexibility, can be changed in shape according to the front rib structure of the wheel, and cooperates with the decorative cap of the selected wheel model to realize a dynamic imaging function of the wheel with different front ribs; the FPC has high temperature resistance and can work normally within 100° C., which effectively eliminates the influence on the dynamic imaging function due to the heat generated during continuous high-speed driving of the automobile, and improves the stability of the dynamic imaging function.

During normal driving of the automobile, the wheel drives the circuit board, the battery bushing and the magnetic coil to rotate; since the eccentric weight is a non-full cylinder, the center of gravity is lower, and the eccentric weight, the strong magnet and the rotating shaft do not rotate under the co-action of the bearing system and the eccentric weight, the magnetic coil continuously cuts the magnetic lines to generate current, and power is supplied to the LED lights through the connecting wires. The wheel and a brake disc are mounted on a load-bearing axle of the automobile, and a brake caliper can be frictionally engaged with the brake disc to brake the automobile. The battery is connected to the magnetic coil and the circuit board via connecting wires respectively. The battery supplies power to the LED lights when the rotational speed of the automobile is low; and the magnetic power generation portion supplies power to the LED lights during normal driving, and stores redundant power to the battery. The control system is mounted in the circuit board, the rotational speed sensor detects the rotational speed of the wheel and transmits the detected data to the control system, and the control system controls the parameters such as color, strength and frequency of a series of LED lights mounted in the FPC via a pre-written program according to the rotational speed of the wheel, so that the front of the wheel presents different dynamic images.

The wheel of the present disclosure has the capability of dynamic imaging, and has the characteristics of simple structure, stable performance, safety and reliability.

BRIEF DESCRIPTION OF DRAWINGS

The embodiments of the present disclosure will be described in detail below in combination with the accompanying drawings, in which.

LIST OF REFERENCE SYMBOLS

Figure 1:
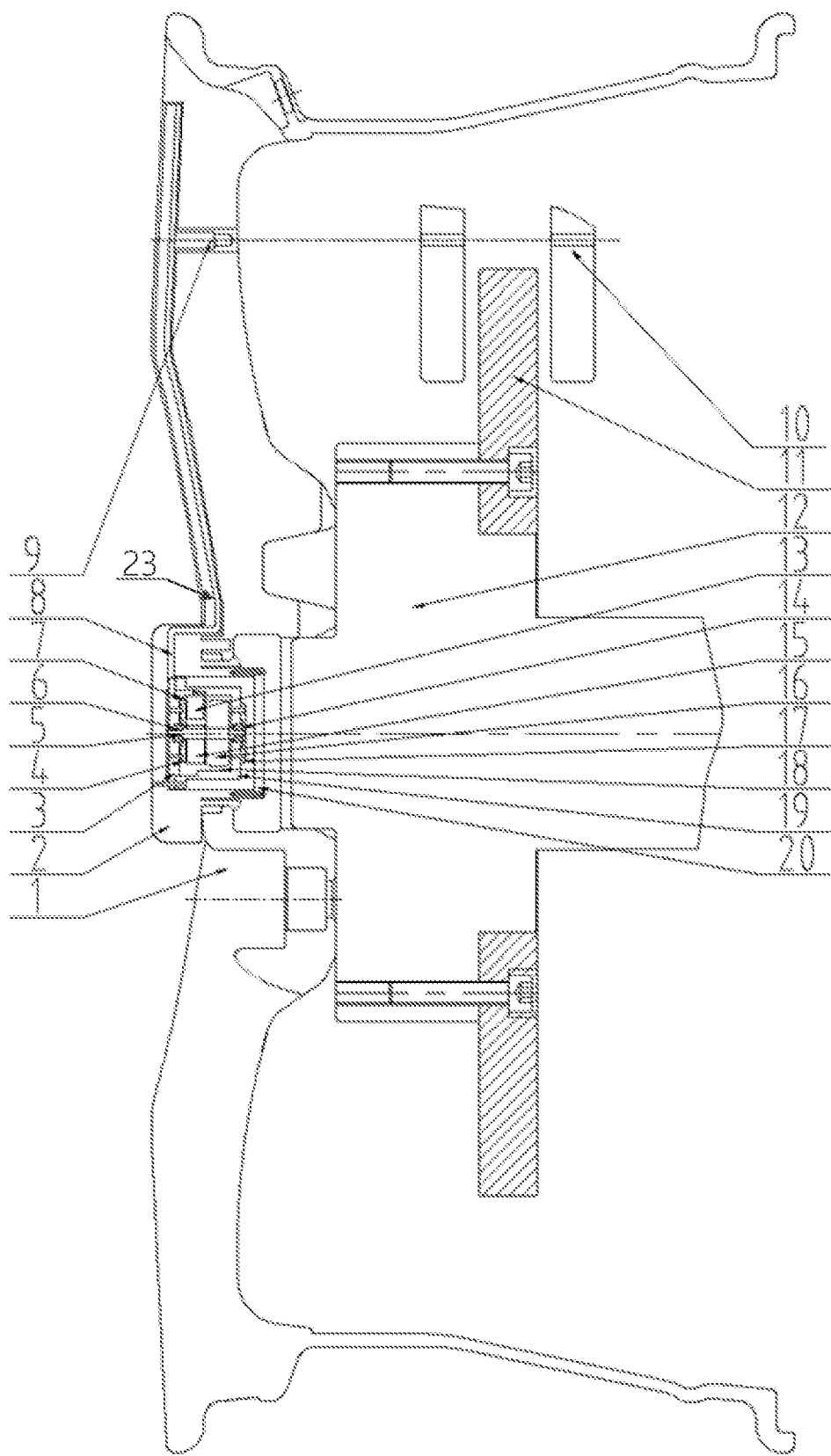
FIG. 1 is a structure diagram of a dynamic imaging wheel according to the present disclosure.
Figure 2:
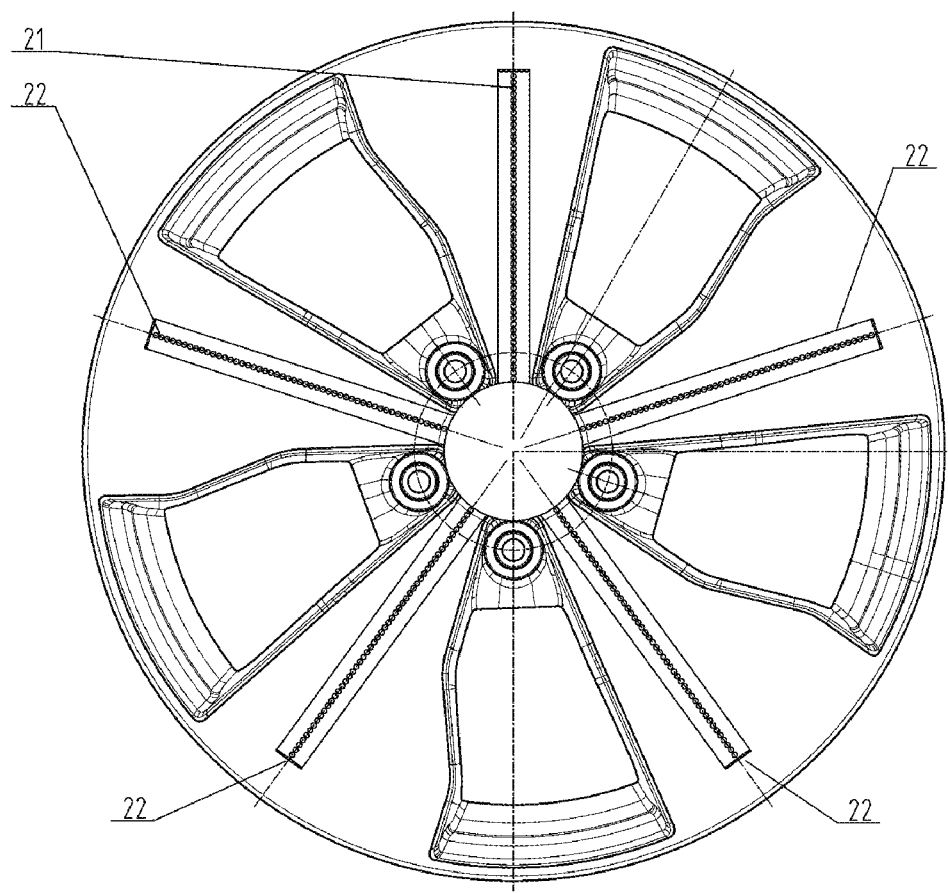
FIG. 2 is a distribution diagram of a power generation mechanism in the dynamic imaging wheel according to the present disclosure.
Figure 3:
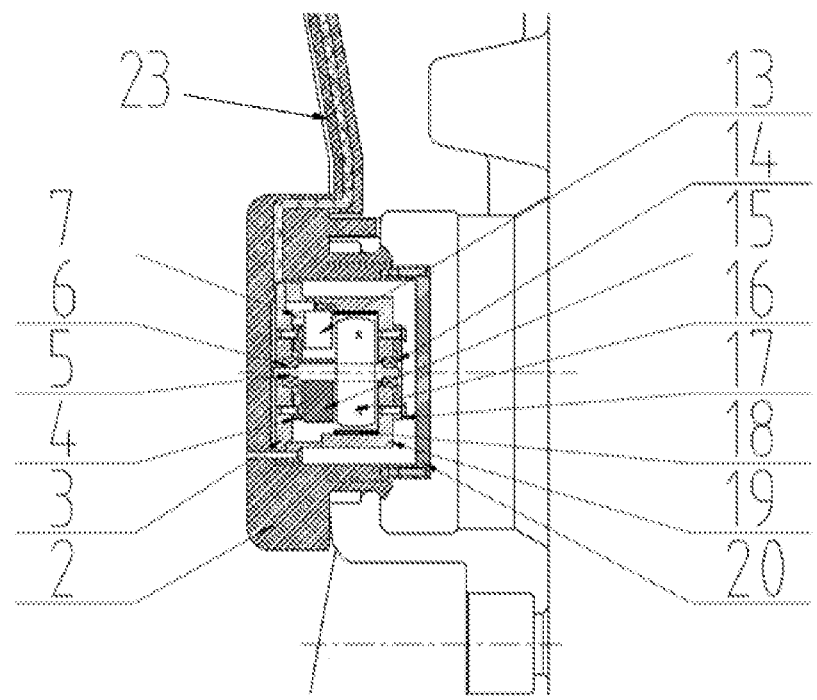
FIG. 3 is a schematic diagram of a front structure of the dynamic imaging wheel according to the present disclosure.
Figure 4:
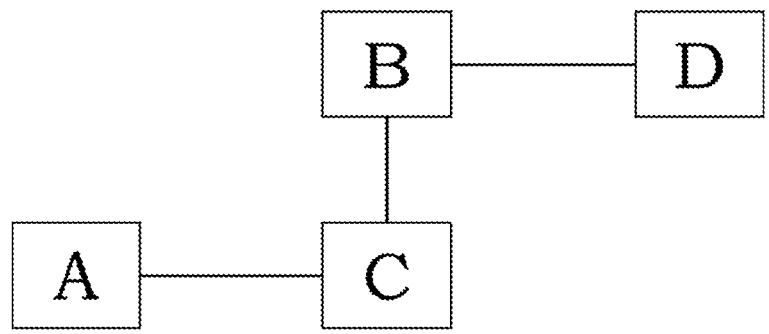
FIG. 4 is a circuit principle diagram of the dynamic imaging wheel according to the present disclosure.

1—wheel, 2—decorative cap, 3—circuit board, 4—first bearing end cap, 5—rotating shaft, 6—first bearing, 7—connecting wire, 8—FPC, 9—rotational speed sensor, 10—brake caliper, 11—brake disc, 12—axle, 13—battery, 14—second bearing, 15—eccentric weight, 16—strong magnet, 17—second bearing end cap, 18—magnetic coil, 19—bushing, 20—decorative cover, 21—LED light, 22—decorative light, 23—mounting arm; A—magnetic power generation portion, B—rotational speed detecting portion, C—dazzling imaging portion and D-control portion.

DETAILED DESCRIPTION

First Embodiment

In the present embodiment, provided is a wheel 1 for displaying dynamic images, the wheel 1 comprising a wheel body and a dazzling imaging portion, in which the wheel body includes a wheel disc surface, a center flange and a rim, the wheel disc surface includes spokes, one end of each spoke is connected to the center flange and the other end is connected to the rim, the center flange includes a center hole and bolt holes uniformly distributed around the center hole, and the rim is connected to the ends of the spokes and extends in a direction perpendicular to the wheel disc surface; the dazzling imaging portion is composed of a circuit board 3, connecting wires 7, an FPC 8, a battery 13, a decorative cap 2 and decorative lights 22; the decorative cap 2 is composed of a circular cover plate and one or more mounting arms 23, the circular cover plate is configured to cover the center hole of the center flange, and the mounting arms 23 extend outward along the spokes; the decorative lights 22 include LED light bars, and the LED light bars are configured such that the beads thereof are separately controlled to be turned on or off; the circuit board 3 is configured to control the beads of the LED light bars to light or extinguish according to certain time sequence; and the decorative lights 22, the battery 13 and the circuit board 3 are connected with the FPC 8 into an electrical circuit by the connecting wires 7. The FPC 8 is mounted on one of the mounting arms 23 of the decorative cap 2, with one end connected to the circuit board 3, the LED light bars are mounted on the FPC 8, and the decorative lights 22 are mounted on the remaining mounting arms 23 of the decorative cap 2. The wheel 1 for displaying dynamic images further includes a magnetic power generation portion, and the magnetic power generation portion includes a bearing end cap, a rotating shaft 5, a first bearing, a second bearing, an eccentric weight 15, a strong magnet 16, a bearing end cap, a magnetic coil 18 and a bushing 19, in which the bearing end cap and the bearing end cap respectively mount the first bearing and the second bearing on the circuit board 3 and the bushing 19, the two ends of the rotating shaft 5 are respectively connected with the first bearing and the second bearing, and the eccentric weight 15 and the strong magnet 16 are fixed in the middle of the rotating shaft 5; the magnetic coil 18 is mounted on the bushing 19; and the magnetic coil 18 is connected to the battery 13 and the circuit board 3 via the connecting wires 7. The shape of the eccentric weight 15 is selected from the group consisting of a pear shape, an ellipse, a non-full cylinder or a rounded corner triangle. A decorative cover 20 is mounted on the decorative cap 2 and encloses the magnetic power generation portion and the battery 13 inside the decorative cap 2. The wheel 1 for displaying dynamic images further includes a rotational speed detecting portion, the rotational speed detecting portion includes a rotational speed sensor 9, and the rotational speed sensor 9 is in data connection with the circuit board 3. The rotational speed sensor 9 is mounted on the decorative cap 2 and connected to the FPC 8, and the rotational speed sensor 9 is configured to transmit the detected rotational speed to the circuit board 3 through the FPC 8. The wheel 1 for displaying dynamic images further includes a control portion which includes a memory and a processor. The memory stores imaging data, and the processor is configured to read the current speed of the automobile from the rotational speed sensor of the rotational speed detecting portion and analyze same, and control the turn-on time, frequency, strength and color of the beads of the LED light bars; and the magnetic power generation part is electrically connected with the dazzling imaging portion by a wire. The middle fastening portion of the decorative cap 2 is an elastic tensioning mechanism.

During normal driving of the automobile, the wheel 1 drives the circuit board 3, the battery bushing and the magnetic coil 18 to rotate; since the eccentric weight 15 is a non-full cylinder, the center of gravity is lower, the eccentric weight 15, the strong magnet 18 and the rotating shaft 5 do not rotate under the co-action of the bearing system and the eccentric weight 15, the magnetic coil 18 continuously cuts the magnetic lines to generate current, and power is supplied to the LED lights 21 through the connecting wires. The wheel 1 and a brake disc 11 are mounted on a load-bearing shaft of the automobile, and a brake caliper 10 can be frictionally engaged with the brake disc 11 to brake the automobile. The battery 13 is connected to the magnetic coil 18 and the circuit board 3 via connecting wires 7 respectively. The battery 13 supplies power to the LED lights 21 when the rotational speed of the automobile is low; and the magnetic power generation portion supplies power to the LED lights 21 during normal driving, and stores redundant power to the battery 13. The control system is mounted in the circuit board 3, the rotational speed sensor detects the rotational speed of the wheel 1 and transmits the detected data to the control system, and the control system controls the parameters such as color, strength and frequency of a series of LED lights 21 mounted in the FPC 8 via a pre-written program according to the rotational speed of the wheel 1, so that the front of the wheel 1 presents different dynamic images. The principle of imaging is to calculate the change frequency of the LED lights 21 by means of the rotational speed. It is supposed that the rotational speed of the wheel 1 is 60 rpm, that is, 60 revolutions per minute, and one revolution per second. A string of LED lights 21 is arranged in the radial direction on the decorative cap 2 of the wheel 1. It is assumed to be 10 LED lights 21 which are numbered from 1 to 10 from the axle center to the edge of the wheel 1. Then it is assumed that the LED lights 21 are 0 degrees just above the wheel 1 at 0 second; if the effect of 6:00 is desired to be displayed on the wheel 1, No. 1-10 lights are lightened at 0 second to display the minute hand, No. 1-5 lights are lightened at 0.5 second to display the hour hand, then No. 1-10 lights are lightened at 1 second to display the minute hand, No. 1-5 lights are lightened at 1.5 second to display the hour hand, and so on. Thus, a complete 6:00 full-clock image will be displayed through visual persistence of human eyes. Complex patterns are also deduced by analogy, as long as 3 points are accurately calculated: 1, initial phase of the LED lights 21; 2, rotational speed of the wheel 1; and 3, current time. It is possible to know the positions of the LED lights 21 at certain moment. As long as the different LED lights 21 are lightened at different positions, a complete pattern can be finally formed. As the number of the LED lights 21 increases, the image effect is clearer.

Second Embodiment

The shape of the eccentric weight of the magnetic power generation portion can be selected from various structures, and three kinds are listed in the present disclosure and compared by experiments. The comparison method is to mount the eccentric weights 15 of the three structures on a tester respectively, and detect the rotational speed of the wheel 1 when the eccentric weights 15 deflect 30 degrees. The test data and results are shown in Table 1.

TABLE 1

Comparison of wheel speeds for different eccentric weights when the same weight deflects.

| Eccentric weight model | Hub size | Bearing model | Wheel speed |
| --- | --- | --- | --- |
| A Pear shape | 20 inches | MR72ZZ | 25 r/s |
| B Ellipse | 20 inches | MR72ZZ | 8 r/s |
| C Rounded corner triangle | 20 inches | MR72ZZ | 15 r/s |

It can be seen from the above table that the pear-shaped structure in the A scheme is optimal.

The invention claimed is:

1. A wheel for displaying images, the wheel comprising a wheel body and an imaging portion, wherein the wheel body comprises a wheel disc surface, a center flange and a rim, the wheel disc surface comprises spokes, a first end of each spoke of the spokes is connected to the center flange and a second end of each spoke of the spokes is connected to the rim, the center flange comprises a center hole and bolt holes uniformly distributed around the center hole, and the rim extends in a direction perpendicular to the wheel disc surface; the imaging portion comprises a circuit board, connecting wires, a flexible circuit board (FPC), a battery, a decorative cap and decorative lights; the decorative cap comprises a circular cover plate and one or more mounting arms, the circular cover plate is configured to cover the center hole of the center flange, and the one or more mounting arms extend outward along the spokes; the decorative lights comprise light-emitting diode (LED) light bars, and the LED light bars are configured such that beads of the LED light bars are separately controlled to be turned on or off; the circuit board is configured to control the beads of the LED light bars to light or extinguish according to a predetermined time sequence; and the decorative lights, the battery and the circuit board are connected with the FPC into an electrical circuit by the connecting wires.

2. The wheel for displaying images according to claim 1, wherein the FPC is mounted on one of the one or more mounting arms of the decorative cap, with one end connected to the circuit board, the LED light bars are mounted on the FPC, and the decorative lights are mounted on remaining one or more mounting arms of the decorative cap.

3. The wheel for displaying images according to claim 1, wherein the wheel for displaying images further comprises a magnetic power generation portion, and the magnetic power generation portion comprises a first bearing end cap, a rotating shaft, a first bearing, a second bearing, an eccentric weight, a magnet, a second bearing end cap, a magnetic coil and a bushing, wherein the first bearing end cap and the second bearing end cap respectively mount the first bearing and the second bearing on the circuit board and the bushing, two ends of the rotating shaft are respectively connected with the first bearing and the second bearing, and the eccentric weight and the magnet are fixed in a middle of the rotating shaft; the magnetic coil is mounted on the bushing; and the magnetic coil is connected to the battery and the circuit board by the connecting wires.

4. The wheel for displaying images according to claim 3, wherein a decorative cover is mounted on the decorative cap and encloses the magnetic power generation portion and the battery inside the decorative cap.

5. The wheel for displaying images according to claim 1, wherein the wheel for displaying images further comprises a rotational speed detecting portion, the rotational speed detecting portion comprises a rotational speed sensor, and the rotational speed sensor is in data connection with the circuit board.

6. The wheel for displaying images according to claim 5, wherein the rotational speed sensor is mounted on the decorative cap and connected to the FPC, and the rotational speed sensor is configured to transmit a detected rotational speed to the circuit board through the FPC.

7. The wheel for displaying images according to claim 5, wherein the wheel for displaying images further comprises a magnetic power generation portion and a control portion, the control portion comprises a memory and a processor, the memory stores imaging data, and the processor is configured to read a current speed of an automobile from the rotational speed sensor of the rotational speed detecting portion and analyze the current speed of the automobile, and control a turn-on time, frequency, strength and color of the beads of the LED light bars; and the magnetic power generation portion is electrically connected with the imaging portion by a wire.

8. The wheel for displaying images according to claim 1, wherein a middle fastening portion of the decorative cap is an elastic tensioning mechanism.

\* \* \* \* \*